United States Patent
Zhang et al.

(10) Patent No.: US 12,143,325 B2
(45) Date of Patent: Nov. 12, 2024

(54) QUASI CO-LOCATED FRAMEWORK FOR BEAM RECEPTION IN A SINGLE FREQUENCY NETWORK

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Fangli Xu, Beijing (CN); Haijing Hu, Los Gatos, CA (US); Haitong Sun, Cupertino, CA (US); Hong He, San Jose, CA (US); Jie Cui, San Jose, CA (US); Oghenekome Oteri, San Diego, CA (US); Wei Zeng, Saratoga, CA (US); Weidong Yang, San Diego, CA (US); Yang Tang, San Jose, CA (US); Yuchul Kim, San Jose, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 17/593,455

(22) PCT Filed: May 15, 2020

(86) PCT No.: PCT/CN2020/090608
§ 371 (c)(1),
(2) Date: Sep. 19, 2021

(87) PCT Pub. No.: WO2021/227043
PCT Pub. Date: Nov. 18, 2021

(65) Prior Publication Data
US 2022/0303090 A1   Sep. 22, 2022

(51) Int. Cl.
*H04L 5/00* (2006.01)
*H04L 1/20* (2006.01)

(52) U.S. Cl.
CPC ............ *H04L 5/0048* (2013.01); *H04L 1/203* (2013.01); *H04L 5/0035* (2013.01)

(58) Field of Classification Search
CPC ..... H04L 1/203; H04L 5/0035; H04L 5/0048; H04L 5/0051; H04L 5/0053;
(Continued)

(56) References Cited

U.S. PATENT DOCUMENTS

| | | | |
|---|---|---|---|
| 2019/0215048 A1* | 7/2019 | Cirik | H04W 76/19 |
| 2019/0229792 A1 | 7/2019 | John Wilson et al. | |

(Continued)

FOREIGN PATENT DOCUMENTS

| | | |
|---|---|---|
| CN | 108199819 | 6/2018 |
| CN | 110034832 | 7/2019 |

(Continued)

OTHER PUBLICATIONS

Ericsson, "Remaining details on QCL"; 3GPP TSG-RAN WG1 #91; R1-1720742; Dec. 1, 2017; 5 sheets.

(Continued)

*Primary Examiner* — Michael Thier
*Assistant Examiner* — Prince A Mensah
(74) *Attorney, Agent, or Firm* — Fay Kaplun & Marcin, LLP (57) ABSTRACT

User equipment (UE) operation in a single frequency network (SFN). The UE may receive one or more transmission configuration indication (TCI) states corresponding to one or more downlink resources, receive a demodulated reference signal (DMRS) wherein the DMRS is quasi co-located (QCLed) with one or more channel state information reference signal (CSI-RS) from multiple cells of a SFN and quasi co-location (QCL) information is included in the one or more TCI and determine a time and frequency offset corresponding to each of the multiple cells based on the CSI-RS.

19 Claims, 4 Drawing Sheets

(58) Field of Classification Search
CPC .. H04L 5/0091; H04W 24/10; H04W 56/004; H04W 72/042; H04W 72/1273; H04W 72/232
See application file for complete search history.

(56) References Cited

U.S. PATENT DOCUMENTS

| | | |
|---|---|---|
| 2019/0320333 A1 | 10/2019 | Koskela et al. |
| 2020/0045709 A1 | 2/2020 | Seo et al. |
| 2020/0107272 A1* | 4/2020 | He ............... H04W 52/325 |
| 2020/0351947 A1* | 11/2020 | Lei ................ H04L 5/0051 |
| 2021/0136762 A1* | 5/2021 | Park .............. H04W 72/0453 |
| 2021/0212101 A1* | 7/2021 | Jiang ............. H04W 72/0453 |
| 2021/0288773 A1* | 9/2021 | Lin ............... H04W 56/001 |
| 2021/0307078 A1* | 9/2021 | Singh ............. H04L 5/0048 |
| 2021/0329564 A1* | 10/2021 | Levy .............. H04B 7/0695 |
| 2023/0028861 A1* | 1/2023 | Yao ............... H04W 52/42 |
| 2023/0062459 A1* | 3/2023 | Abdelghaffar ....... H04B 7/0408 |
| 2023/0069636 A1* | 3/2023 | Matsumura .......... H04B 7/0695 |
| 2023/0179279 A1* | 6/2023 | Huang ............... H04B 7/088 |
| | | 370/252 |

FOREIGN PATENT DOCUMENTS

| | | |
|---|---|---|
| CN | 110366250 | 10/2019 |
| CN | 110719632 | 1/2020 |
| WO | 2019/029632 | 2/2019 |
| WO | 2019/195171 | 10/2019 |

OTHER PUBLICATIONS

ZTE, "Further discussion on CSI-RS based RLM"; 3GPP TSG-RAN WG4 Meeting #86bis; R4-1804477; Apr. 20, 2018; 5 sheets.

Nokia et al., "Remaining Details of TRS Design", 3GPP TSG-RAN WG1 Meeting #92, R1-1802563, Feb. 16, 2018, 10 sheets.

* cited by examiner

QUASI CO-LOCATED FRAMEWORK FOR BEAM RECEPTION IN A SINGLE FREQUENCY NETWORK

BACKGROUND

A single frequency network (SFN) may refer to a wireless network where multiple cells simultaneously transmit the same signal over the same channel. The SFN may use beamforming which is an antenna technique used to transmit a directional signal. In this type of scenario, downlink reception at a user equipment (UE) may include combining beams from multiple transmission points. Thus, the UE may have to track the time and frequency offset from the multiple cells.

SUMMARY

Some exemplary embodiments are related to a method performed by a user equipment (UE). The method includes receiving one or more transmission configuration indication (TCI) states corresponding to one or more downlink resources, receiving a demodulated reference signal (DMRS) wherein the DMRS is quasi co-located (QCLed) with one or more channel state information reference signal (CSI-RS) from multiple cells of a single frequency network (SFN) and quasi co-location (QCL) information is included in the one or more TCI and determining a time and frequency offset corresponding to each of the multiple cells based on the CSI-RS.

Other exemplary embodiments are related to a user equipment (UE) having a transceiver and a processor. The transceiver is configured to connect to multiple cells of a single frequency network (SFN). The processor is configured to receive one or more transmission configuration indication (TCI) states corresponding to one or more downlink resources, receive a demodulated reference signal (DMRS) wherein the DMRS is quasi co-located (QCLed) with one or more channel state information reference signal (CSI-RS) from the multiple cells of the SFN and quasi co-location (QCL) information is included in the one or more TCI, and determine a time and frequency offset corresponding to each of the multiple cells based on the CSI-RS.

Still further exemplary embodiments are related to a method performed by a user equipment (UE). The method includes receiving one or more transmission configuration indication (TCI) states corresponding to one or more downlink resources, receiving a demodulated reference signal (DMRS) wherein the DMRS is quasi co-located (QCLed) with a channel state information reference signal (CSI-RS), the CSI-RS is QCLed with multiple system synchronization blocks (SSBs) from multiple cells of a single frequency network (SFN) and quasi co-location (QCL) information is included in the one or more TCI and determining a time and frequency offset corresponding to each of the multiple cells based on the CSI-RS and at least one of the SSBs.

Additional exemplary embodiments are related to a user equipment (UE) having a transceiver and a processor. The transceiver is configured to connect to multiple cells of a single frequency network (SFN). The processor is configured to receive one or more transmission configuration indication (TCI) states corresponding to one or more downlink resources, receive a demodulated reference signal (DMRS) wherein the DMRS is quasi co-located (QCLed) with a channel state information reference signal (CSI-RS), the CSI-RS is QCLed with multiple system synchronization blocks (SSBs) from the multiple cells of the SFN and quasi co-location (QCL) information is included in the one or more TCI, and determine a time and frequency offset corresponding to each of the multiple cells based on the CSI-RS and at least one of the SSBs.

DETAILED DESCRIPTION

The exemplary embodiments may be further understood with reference to the following description and the related appended drawings, wherein like elements are provided with the same reference numerals. The exemplary embodiments relate to downlink reception at a user equipment (UE) operating in a single frequency network (SFN) that utilizes beamforming.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to beamforming. A person of ordinary skill in the art would understand that beamforming is an antenna technique that is utilized to transmit or receive a directional signal. From the perspective of a transmission point (e.g., a cell), beamforming may refer to propagating a directional signal. Throughout this description, a beamformed signal may be referred to as a beam. The beam may be generated by having a plurality of antenna elements radiate the same signal. Increasing the number of antenna elements radiating the signal decreases the width of the radiation pattern and increases the gain. The exemplary embodiments relate to the UE receiving a beam from multiple cells.

In addition, the exemplary embodiments are described with regard to a 5G New Radio (NR) cellular network. However, reference to a 5G NR network is merely provided for illustrative purposes. The exemplary embodiments may be utilized with any network that implements beamforming the same signal from multiple transmission points. Therefore, the 5G NR network as described herein may represent any network that includes the functionalities associated with beamforming.

The 5G NR network may use an SFN mode. SFN may refer to a wireless network where two or more cells simultaneously transmit the same signal over the same frequency channel. The SFN may be deployed for a coverage area where UEs are expected to exhibit high speed mobility. For example, the SFN may be deployed for a high speed train (HST) system. The SFN provides a performance benefit for UEs on the HST system because it can reduce handover occasions and increase system robustness. However, the exemplary embodiments are not limited to the context of an HST system and may be applicable to any coverage area that utilizes SFN mode.

For SFN mode, downlink reception at the UE may be based on combining beams from multiple cells. From the perspective of the UE, the presence of different SFN cells may be transparent. However, the beams from each cell may have different characteristics. For example, the synchronization signal blocks (SSBs) associated with each cell may be different. With regard to time and frequency offset, the UE tracks the SSBs and corresponding tracking reference signals (TRS).

The demodulation reference signal (DMRS) of a physical downlink control channel (PDCCH) or physical downlink shared channel (PDSCH) may be quasi co-located (QCLed) with a TRS. The TRS may also be QCLed with one SSB. The UE may use either of these concepts for time and frequency offset tracking. The exemplary embodiments relate to defining a quasi co-location (QCL) framework for DMRS or PDCCH/PDSCH to facilitate the tracking of time and frequency offset from multiple SFN cells.

Figure 1:
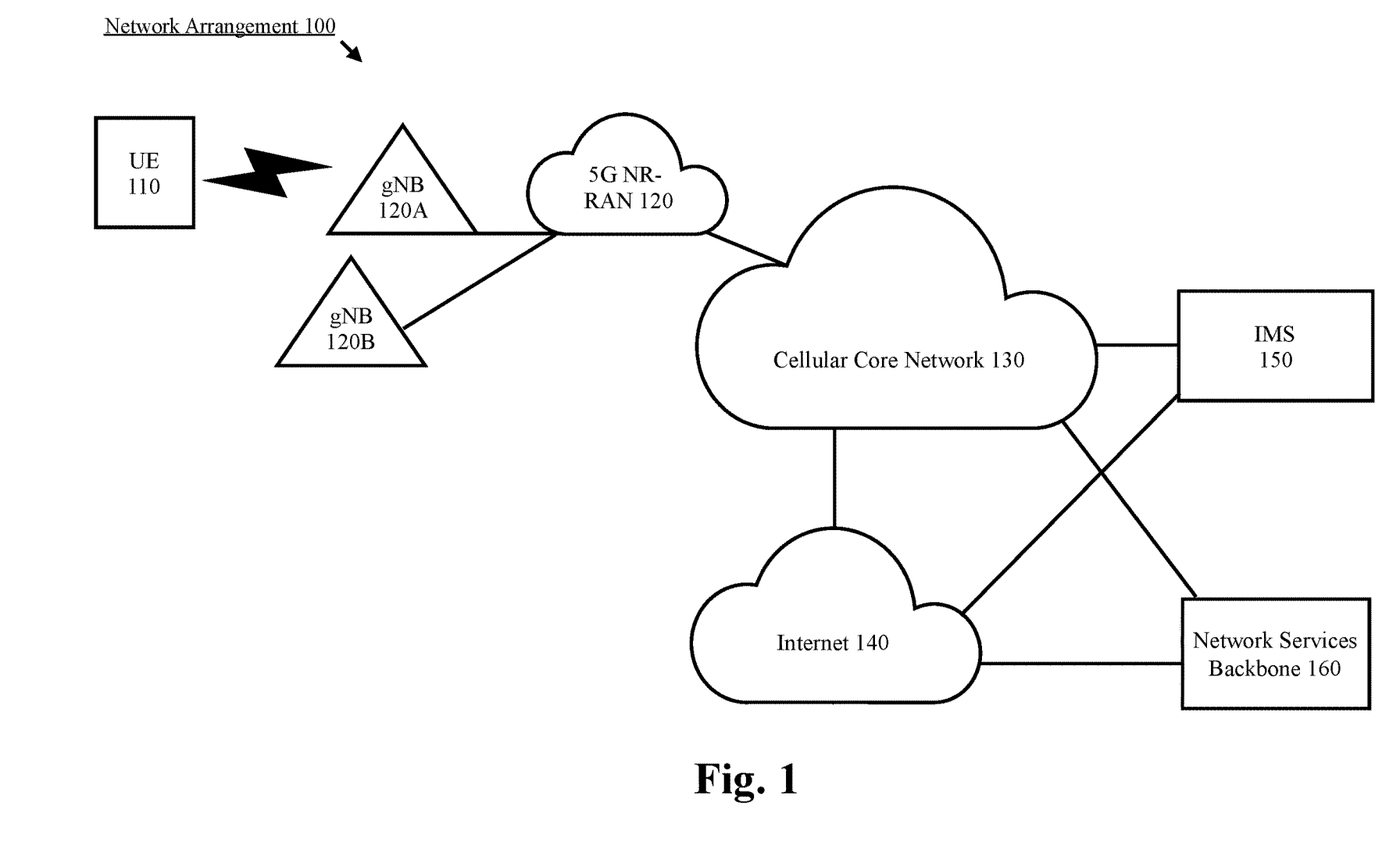
FIG. 1 shows an exemplary network arrangement according to various exemplary embodiments.

FIG. 1 shows a network arrangement 100 according to various exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may communicate with one or more networks. In the example of the network configuration 100, the network with which the UE 110 may wirelessly communicate is a 5G New Radio (NR) radio access network (5G NR-RAN) 120. However, the UE 110 may also communicate with other types of networks (e.g., LTE, legacy, wireless local area network (WLAN), etc.) and the UE 110 may also communicate with networks over a wired connection. Therefore, the UE 110 may include a 5G NR chipset to communicate with the 5G NR-RAN 120.

The 5G NR-RAN 120 may be a portion of a cellular network that may be deployed by cellular providers (e.g., Verizon, AT&T, Sprint, T-Mobile, etc.). The network 120 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The base stations (e.g., the gNB 120A, the gNB 120B) may include one or more communication interfaces to exchange data and/or information with camped UEs, the corresponding RAN, the cellular core network 130, the internet 140, etc. Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120).

As mentioned above, the exemplary embodiments relate to an SFN. In this example, the 5G NR-RAN 120 may provide SFN functionality using the gNB 120A and the gNB 120B. That is, the gNB 120A and the gNB 120B may be configured to transmit the same signal simultaneously to the UE 110.

In addition to the network 120 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
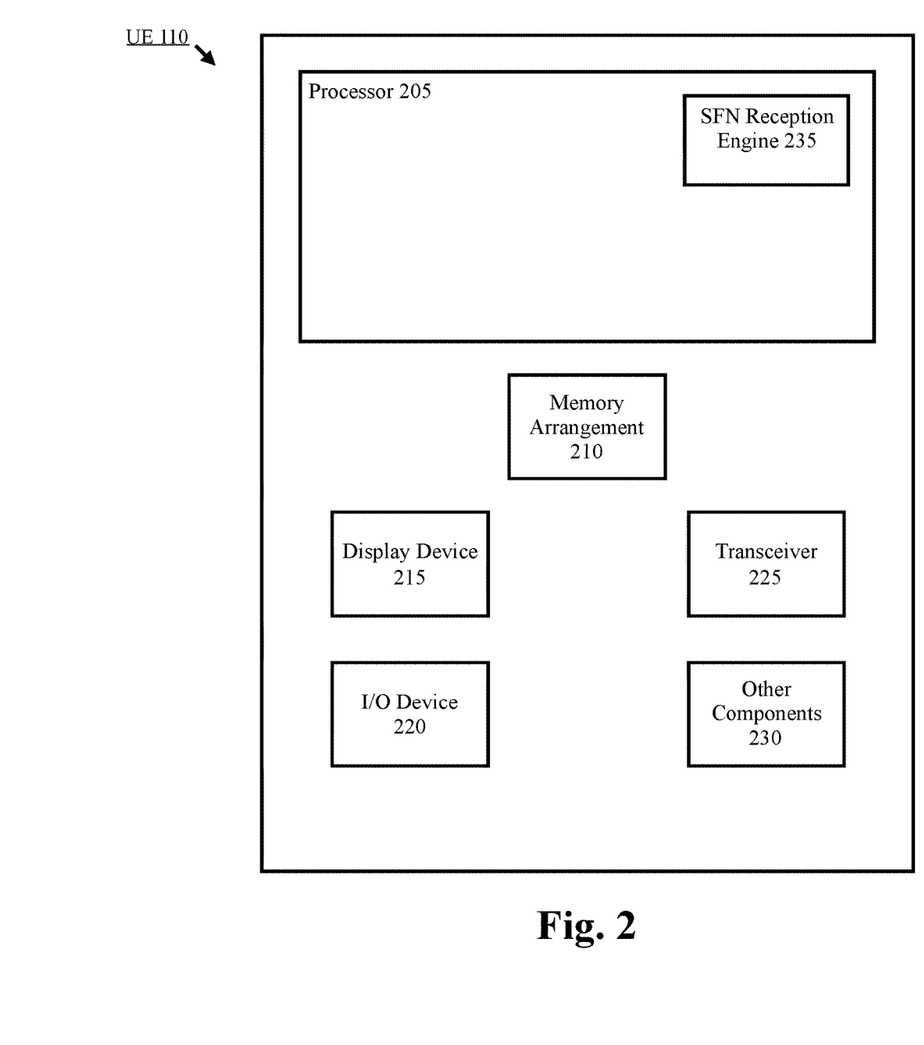
FIG. 2 shows an exemplary user equipment (UE) according to various exemplary embodiments.

FIG. 2 shows an exemplary user equipment (UE) 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, a SIM card, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include an SFN reception engine 235. The SFN reception 235 may perform various operations related to receiving and combining beams from multiple cells (e.g., the gNB 120A and the gNB 120B).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 1120 may be separate components or integrated together such as a touchscreen. The transceiver 225 may be a hardware component configured to establish a connection with the 5G NR-RAN 120 and any other appropriate type of wireless network. Accordingly, the transceiver 225 may operate on a variety of different frequencies or channels (e.g., set of consecutive frequencies).

Figure 3:
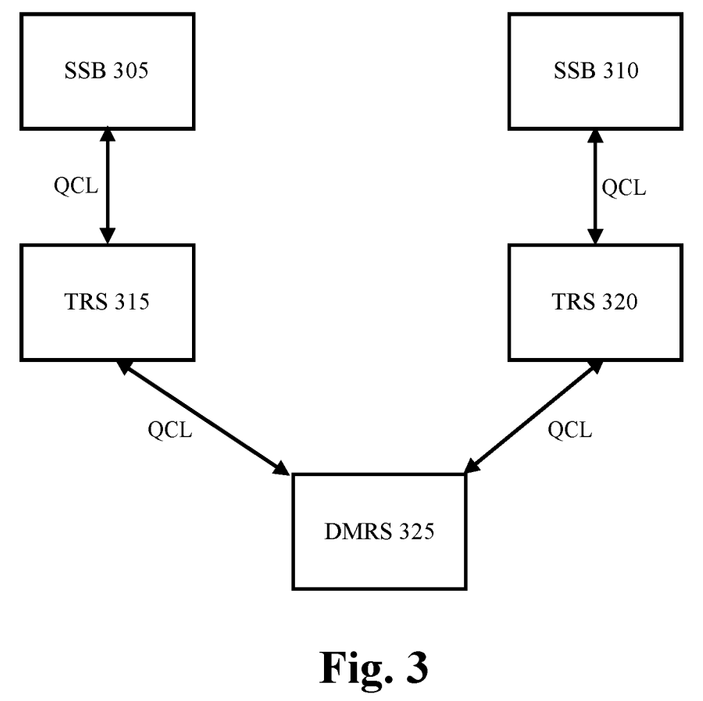
FIG. 3 illustrates an exemplary quasi co-location (QCL) framework in which a demodulation reference signal (DMRS) is QCLed with one or more tracking reference signal (TRS) and each TRS is QCLed with a system synchronization block (SSB).

In a first aspect, the exemplary embodiments relate to implementing a QCL framework for one DMRS that is QCLed with one or more TRS to facilitate the tracking of time and frequency offset from multiple cells. FIG. 3 illustrates an exemplary QCL framework in which a DMRS is QCLed with one or more TRS and each TRS is QCLed with an SSB. For example, consider a scenario in which the gNB 120A and the gNB 120B are operating in SFN mode and serving the UE 110. In this example, the gNB 120A transmits a first SSB 305 and the gNB 120B transmits a second SSB 310.

Each SSB is QCLed with a respective TRS. As shown in FIG. 3, the SSB 305 is QCLed with the TRS 315 and the SSB 310 is QCLed with the TRS 320. Each TRS is also QCLed with the same DMRS. As shown in FIG. 3, both the TRS 315 and the TRS 320 are QCLed with the same DMRS 325. The exemplary embodiments are not limited to DMRS, the QCL framework illustrated in FIG. 3 may also be applicable any type of information and/or data transmitted on the PDCCH, the PDSCH or any other appropriate type of downlink channel.

The following exemplary embodiments relate to implementing the QCL framework depicted in FIG. 3 to facilitate the tracking of time and frequency offset from multiple cells (e.g., gNB 120A, gNB 120B). Although the following examples are described with regard to two cells, those skilled in the art will understand how the exemplary concepts described herein may be applicable to scenarios that include more than two cells.

The network may transmit a transmission configuration indication (TCI) to the UE 110 for a control resource set (CORESET) or PDSCH. The TCI may indicate to the UE 110 the QCL relationships between antenna ports used for downlink communications.

QCL information may be included such as, but not limited to, a cell ID, a bandwidth part (BWP) ID, a reference signal list, a serving cell index, a QCL type (e.g., typeA, typeB, typeC, typeD) and a maxNrofReferenceSignalforQCL indication which may be based on UE capability information. The cells of the network may configure multiple (CSI-RS) resources with same QCL type. The QCL type may indicate one or more QCL parameters including, but not limited to, doppler shift, doppler spread, average delay, delay spread, etc.

Multiple TCI states may be configured to a CORESET or activated for PDSCH. For a CORESET, a cell may indicate multiple TCI states using a medium access control (MAC) control element (CE). The DMRS port for PDCCH in the corresponding CORESET may be QCLed based on a combination of the reference signals in the indicated TCI states. For PDSCH, the cell may activate multiple TCI states corresponding to a TCI codepoint in downlink control information (DCI) using a MAC CE. The TCI states for PDSCH reception may be indicated by DCI. Further, the DMRS ports for PDSCH may be QCLed based on a combination of the reference signals indicated by the TCI states. In some embodiments, when more than one TCI state is indicated, the gNB may configure whether DMRS ports for PDSCH are QCLed with the reference signals in the indicated TCI states, or different DMRS ports for PDSCH are QCLed with reference signals in different indicated TCI states. The configuration may be based on a RRC signaling, MAC CE or DCI.

In some embodiments, the multiple TCI states referenced above may be applicable when no QCL typeD is configured in the TCI states. Alternatively, if multiple QCL typeD are indicated in the TCI states, the UE 110 may follow the TCI state with the lowest or highest ID. Alternatively, the QCL typeD, when applicable, indicated by the TCI states may be the same.

When a DMRS of the PDCCH is QCLed with multiple CSI-RS, it may be up to UE 110 implementation as to which CSI-RS may be used for radio link monitoring (RLM) or beam failure detection (BFD). In one embodiment, the UE 110 may select the CSI-RS to perform RLM or BFD for the CORESET based on the resource ID. In this example, the highest or lowest resource ID may be selected. However, in an actual operating scenario, any resource ID may be selected for any appropriate reason.

In another embodiment, the UE 110 may select the CSI-RS to perform RLM or BFD for the CORESET based on the periodicity and resource ID. The UE 110 may select the CSI-RS with the lowest periodicity. If the periodicity is the same for multiple CSI-RS, the UE 110 may select the CSI-RS with the lowest resource ID.

In a further embodiment, the UE 110 may select the CSI-RS to perform RLM or BFD based on all of the configured CSI-RS resources. The RLM/BFD performance may be determined by a type of block error rate (BLER) (e.g., minimal, maximum, average, hypothetical, etc.) among the CSI-RS resources. However, the exemplary QCL framework is not required to have TCI for PDCCH and there may be scenarios in which this type of TCI is not configured for PDCCH.

Figure 4:
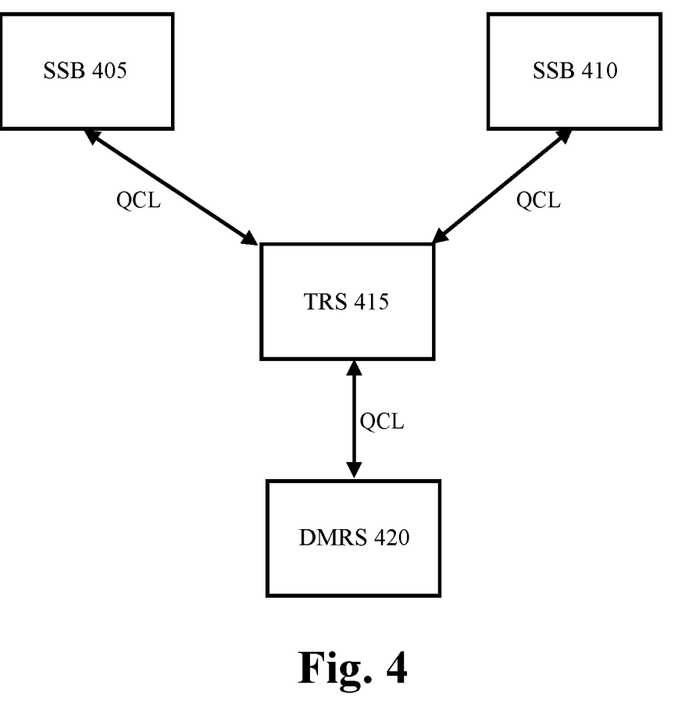
FIG. 4 illustrates an exemplary QCL framework in which a DMRS is QCLed with a single TRS and the TRS is QCLed with one or more SSB.

In a second aspect, the exemplary embodiments relate to implementing a QCL framework for one TRS that is QCLed with one or more SSB to facilitate the tracking of time and frequency offset from multiple cells. FIG. 4 illustrates an exemplary QCL framework in which a DMRS is QCLed with a single TRS and the TRS is QCLed with one or more SSB. For example, consider a scenario in which a gNB 120A and the gNB 120B are operating in SFN mode and serving the UE 110. In this example, the gNB 120A transmits a first SSB 405 and the gNB 120B transmits a second SSB 410.

Each SSB is QCLed with a respective TRS. As shown in FIG. 4, the both SSB 405 and SSB 410 are QCLed with the TRS 415. The TRS is also QCLed with the DMRS. As shown in FIG. 4, the TRS 415 is QCLed with the DMRS 420. The exemplary embodiments are not limited to DMRS, the QCL framework illustrated in FIG. 4 may also be applicable any type of information and/or data transmitted on the PDCCH, the PDSCH or any other appropriate type of downlink channel.

The following exemplary embodiments relate to implementing the QCL framework depicted in FIG. 4 to facilitate the tracking of time and frequency offset from multiple cells (e.g., gNB 120A, gNB 120B). Although the following examples are described with regard to two cells, those skilled in the art will understand how the exemplary concepts described herein may be applicable to scenarios that include more than two cells.

The network may transmit (TCI) to the UE 110 for a control resource set (CORESET) or PDSCH. The TCI may indicate to the UE 110 the QCL relationships between antenna ports used for downlink communications.

QCL information may be included such as, but not limited to, a cell ID, a bwp ID, a reference signal list, a serving cell index, a QCL type (e.g., typeA, typeB, typeC, typeD) and a maxNrofReferenceSignalforQCL indication which may be based on UE capability information. The cells of the network may configure multiple SSB resources with same QCL type. The QCL type may indicate one or more QCL parameters including, but not limited to, doppler shift, doppler spread, average delay, delay spread, etc.

Multiple TCI states may be configured for CSI-RS. The CSI-RS may be QCLed based on a combination of the reference signals in the indicated TCI states. For periodic CSI-RS, multiple TCI states may be configured by radio resource control (RRC) signaling per CSI-RS resource. For semi-persistent CSI-RS, multiple TCI states may be configured by MAC CE per CSI-RS resource. For aperiodic CSI-RS, each triggering state in DCI may correspond to multiple TCI states. The multiple TCI states may be applicable when no QCL typeD is configured in the TCI states. Alternatively, if multiple QCL typeD are indicated in the TCI states, the UE 110 may follow the TCI state with the lowest or highest ID.

To facilitate automatic gain control (AGC), the UE 110 may be aware of the transmission power offset between SSB and TRS as well as TRS and PDSCH. The power offset between TRS and SSB may be configured by the layer 1 (L1) parameter Pc_ss. If multiple SSBs are configured in the TCI state for the TRS the SSB may be based on the same transmission power. In other embodiments, if the SSBs are based on different transmission power, the Pc_ss is based on the minimal or maximum or average transmission power among QCLed SSBs.

Regardless of which QCL framework mentioned above is utilized, when the UE 110 is configured with multiple serving cells and multiple reference signals are configured as its QCL source with the same parameters, there are several cross carrier indication options that may be utilized. In one embodiment, the reference signals may be from the same serving cell as the target downlink signal. In another embodiment, the reference signal may be from the same service call (either the same as or different from that of the target downlink signal). In a further embodiment, the reference signals may be from different serving cells. In another embodiment, the reference signals may be allowed with the same bandwidth in the same serving cell so that the UE 110 may easily combine them.

For uplink communication, if a TCI state with multiple downlink reference signals as a QCL source is configured for uplink transmission, the UE 110 may derive uplink power control pathloss based on the downlink reference signals. In some embodiments, the pathloss may be derived based on one reference signal in the TCI state. The reference signal may be selected based on the resource ID (e.g., the highest ID, the lowest ID or any other appropriate basis). Alternatively, the reference signal may be selected based on the periodicity and the resource ID. For example, the UE 110 may select the reference signals with the lowest periodicity. If the periodicity is the same for the reference signal, the UE 110 may select the reference signal with the lowest resource ID.

In other embodiments, the pathloss may be derived based on all the reference signals in the TCI state. In one example, the pathloss may equal the transmission power minus the average receiving power for each reference signal. In another example, the pathloss may equal the transmission power minus the maximum receiving power among each reference signal. In a further example, the pathloss may equal the transmission power minus the minimum receiving power among each reference signal.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE):
receiving downlink control information (DCI) comprising a transmission configuration indication (TCI) codepoint with multiple TCI states for a physical downlink shared channel (PDSCH);
receiving a demodulated reference signal (DMRS), wherein DMRS ports for the PDSCH are quasi co-located (QCLed) with one or more channel state information reference signal (CSI-RS) of the multiple TCI states, wherein the one or more CSI-RS are from multiple cells of a single frequency network (SFN) based on the multiple TCI states; and
determining a time and frequency offset corresponding to each of the multiple cells based on the CSI-RS.

2. The method of claim 1, further comprising:
selecting a first CSI-RS from the one or more CSI-RS to provide the basis for one of radio link monitoring (RLM) or beam failure detection (BFD) based on the first CSI-RS corresponding to a highest or lowest resource ID.

3. The method of claim 1, further comprising:
selecting a first CSI-RS from the one or more CSI-RS to provide the basis for one of radio link monitoring (RLM) or beam failure detection (BFD) based on the first CSI-RS corresponding to a lowest periodicity, wherein selecting the first CSI-RS is further based on the first CSI-RS corresponding to the lowest resource ID.

4. The method of claim 1, further comprising:
selecting a first CSI-RS from the one or more CSI-RS to provide the basis for one of radio link monitoring (RLM) or beam failure detection (BFD) based on a block error rate (BLER) of the first CSI-RS.

5. The method of claim 1,
wherein a first CSI-RS is QCLed with a first system synchronization block (SSB) corresponding to a first cell of the SFN and a second CSI-RS is QCLed with a second SSB corresponding to a second different cell of the SFN, and
wherein determining the time and frequency offset corresponding to each of the multiple cells is further based on the first SSB and the second SSB.

6. The method of claim 1, further comprising:
deriving an uplink power control pathloss based on one reference signal indicated by the multiple TCI states, wherein the reference signal is selected based on at least one of a resource ID or a periodicity.

7. The method of claim 1, further comprising:
deriving an uplink power control pathloss based on multiple reference signals indicated by the multiple TCI states, wherein the uplink power control pathloss is equal to the transmission power minus one of i) an average receiving power for the multiple reference signals, ii) a maximum receiving power among the multiple reference signals and iii) a minimum receiving power among the multiple reference signals.

8. The method of claim 1, further comprising:
receiving a further one or more DMRS, wherein the DMRS and the further one or more DMRS are received from a cell that transmits a target downlink signal.

9. The method of claim 1, further comprising:
receiving a further one or more DMRS, wherein the DMRS and the further one or more DMRS are allocated with a same bandwidth.

10. A user equipment (UE), comprising:
a transceiver configured to connect to multiple cells of a single frequency network (SFN); and
a processor configured to:
receive downlink control information (DCI) comprising a transmission configuration indication (TCI) codepoint with multiple TCI states for a physical downlink shared channel (PDSCH),
receive a demodulated reference signal (DMRS), wherein DMRS ports for the PDSCH are quasi co-located (QCLed) with one or more channel state information reference signal (CSI-RS) of the multiple TCI states, wherein the one or more CSI-RS are from multiple cells of a single frequency network (SFN), and
determine a time and frequency offset corresponding to each of the multiple cells based on the CSI-RS.

11. An apparatus comprising processing circuitry configured to:
process, based on signals received from a network, downlink control information (DCI) comprising a transmission configuration indication (TCI) codepoint with multiple TCI states for a physical downlink shared channel (PDSCH);

process, based on signals received from the network, a demodulated reference signal (DMRS), wherein DMRS ports for the PDSCH are quasi co-located (QCLed) with one or more channel state information reference signal (CSI-RS) of the multiple TCI states, wherein the one or more CSI-RS are from multiple cells of a single frequency network (SFN) based on the multiple TCI states; and
determine a time and frequency offset corresponding to each of the multiple cells based on the CSI-RS.

12. The apparatus of claim 11, further configured to:
select a first CSI-RS from the one or more CSI-RS to provide the basis for one of radio link monitoring (RLM) or beam failure detection (BFD) based on the first CSI-RS corresponding to a highest or lowest resource ID.

13. The apparatus of claim 11, further configured to:
select a first CSI-RS from the one or more CSI-RS to provide the basis for one of radio link monitoring (RLM) or beam failure detection (BFD) based on the first CSI-RS corresponding to a lowest periodicity, wherein selecting the first CSI-RS is further based on the first CSI-RS corresponding to the lowest resource ID.

14. The apparatus of claim 11, further configured to:
select a first CSI-RS from the one or more CSI-RS to provide the basis for one of radio link monitoring (RLM) or beam failure detection (BFD) based on a block error rate (BLER) of the first CSI-RS.

15. The apparatus of claim 11, wherein a first CSI-RS is QCLed with a first system synchronization block (SSB) corresponding to a first cell of the SFN and a second CSI-RS is QCLed with a second SSB corresponding to a second different cell of the SFN, and
wherein the processing circuitry determines the time and frequency offset corresponding to each of the multiple cells based on the first SSB and the second SSB.

16. The apparatus of claim 11, further configured to:
derive an uplink power control pathloss based on one reference signal indicated by the multiple TCI states, wherein the reference signal is selected based on at least one of a resource ID or a periodicity.

17. The apparatus of claim 11, further configured to:
derive an uplink power control pathloss based on multiple reference signals indicated by the multiple TCI states, wherein the uplink power control pathloss is equal to the transmission power minus one of i) an average receiving power for the multiple reference signals, ii) a maximum receiving power among the multiple reference signals and iii) a minimum receiving power among the multiple reference signals.

18. The apparatus of claim 11, further configured to:
process, based on signals received from the network, a further one or more DMRS, wherein the DMRS and the further one or more DMRS are received from a cell that transmits a target downlink signal.

19. The apparatus of claim 11, further configured to:
process, based on signals received from the network, a further one or more DMRS, wherein the DMRS and the further one or more DMRS are allocated with a same bandwidth.

* * * * *